United States Patent
Mery

[11] 4,018,309
[45] Apr. 19, 1977

[54] DISC BRAKE AND LOCKING MEANS THEREFOR

[75] Inventor: Jean-Claude Mery, Pavillons sous Bois, France

[73] Assignee: Societe Anonyme D.B.A., Clichy, France

[22] Filed: Oct. 10, 1975

[21] Appl. No.: 621,439

[30] Foreign Application Priority Data

Oct. 30, 1974 France .............................. 74.36265

[52] U.S. Cl. .............................. 188/72.4; 188/73.6
[51] Int. Cl.² ......................................... F16D 55/18
[58] Field of Search .............. 188/72.4, 72.5, 73.3, 188/73.6, 370, 73.1

[56] References Cited
UNITED STATES PATENTS

| | | | |
|---|---|---|---|
| 3,334,708 | 8/1967 | Swift | 188/72.4 |
| 3,500,966 | 3/1970 | Birge | 188/72.4 |
| 3,552,527 | 1/1971 | Hayes | 188/73.3 |
| 3,734,248 | 5/1973 | Fay | 188/72.4 X |

*Primary Examiner*—Trygve M. Blix
*Assistant Examiner*—Douglas C. Butler
*Attorney, Agent, or Firm*—Ken C. Decker; Paul D. Schoenle; William N. Antonis

[57] ABSTRACT

In a disc brake of the type in which at least one fluid pressure actuated piston is associated with a caliper to urge a first friction element directly onto a first friction face of the disc, the caliper being slidable by way of at least one column on a torque-taking member to urge by reaction a second friction element on to the other side of the disc, a locking connection is provided between the second friction element and the column to immobilize the column with respect to the caliper through a removable support connection provided between the second friction element and the caliper. The locking connection is preferably comprised of at least one extension of the backing plate of the second friction element, this extension being designed to fit into a corresponding slot in the at least one column.

5 Claims, 4 Drawing Figures

DISC BRAKE AND LOCKING MEANS THEREFOR

The invention relates to a disc brake.

More particularly, the invention relates to a disc brake of the type in which a first friction element is urged directly into engagement with one side of a rotary disc by brake-applying means, the latter being associated with a caliper slidable on a fixed support by a way of at least one column, so as to urge a second friction element on to the other side of the disc by reaction.

In this type of brake, the axial column or columns are usually connected to the caliper by way of pins or the like, and the friction element urged on to the disc by reaction, and known as the outer pad, is directly associated with the caliper's reaction portion, which adjoins it. Consquently, the column or columns on the one hand and the outer pad on the other are associated with the caliper by separate fixing means. Disc brakes of this type therefore have a relatively large number of components and take a relatively long time to assemble and dismantle.

To overcome these disadvantages, the invention proposes a disc brake of the type comprising a caliper slidable by way of at least one column on a torque-taking member, actuating means being associated with the caliper to urge a first friction element directly on to a first side of a disc and a second friction element being attached to the caliper by removable support means so that the second friction element can be extracted from the remainder of the brake after removal of the support means, and locking means being provided to immobilize said at least one column axially relative to the caliper, this brake being characterized in that the locking means are provided between said at least one column and the second friction element. In a particular embodiment of the invention, the locking means comprise at least one portion of the second friction element, this portion being designed to fit into or onto a corresponding portion formed on each column, so as to connect said at least one column and second friction element axially. Preferably, the said portion of the second friction element comprises at least two surfaces substantially perpendicular to the axis of the disc.

According to another characteristic of this embodiment of the invention, the surfaces are formed by the faces of the backing plate of the second friction element and cooperate with corresponding slots in said at least one column. The slots may be annular grooves or alternatively recesses extending over part of the circumference of each column.

An embodiment of the invention will now be described by way of example with reference to the accompanying drawings, in which.

Figure 1:
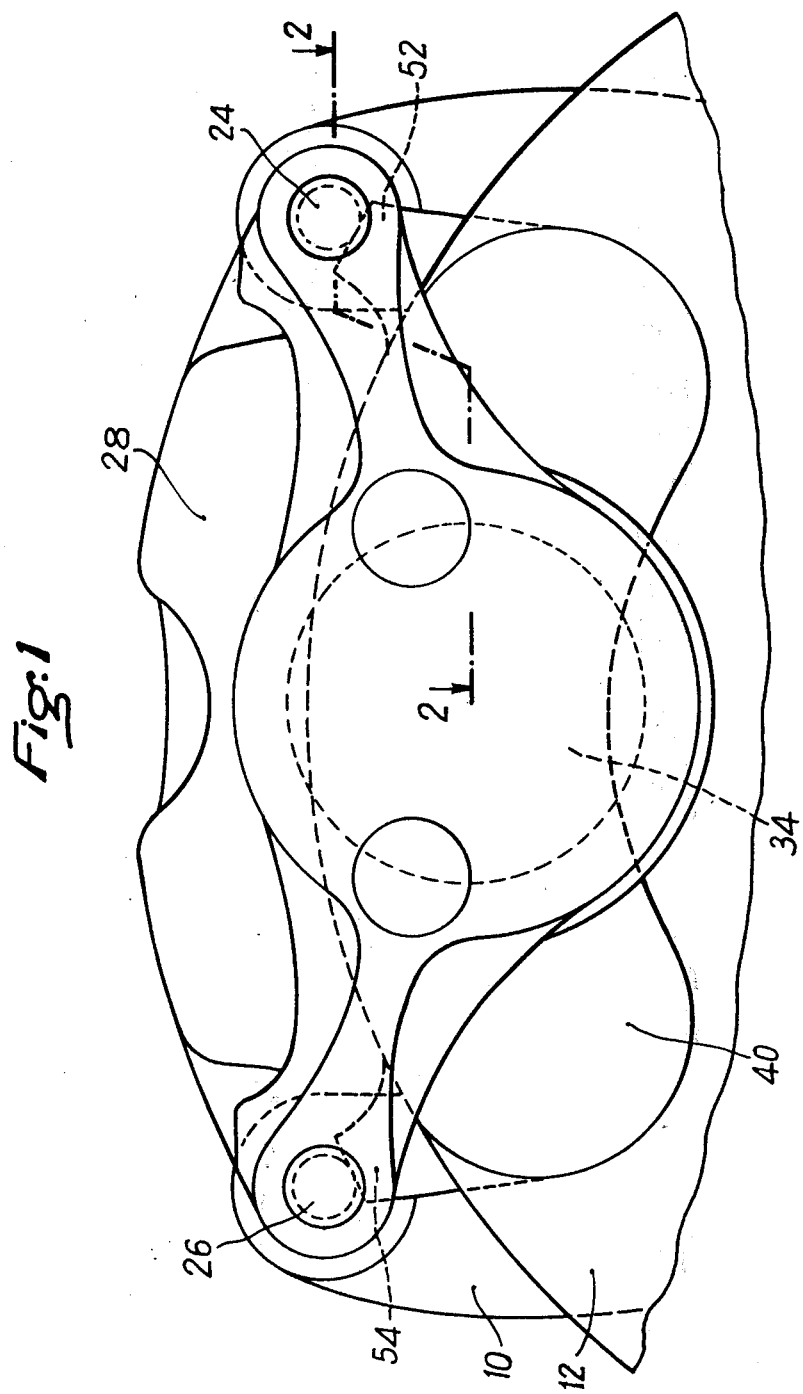
FIG. 1 represents a disc brake embodying the principles of the invention.

In the disc brake illustrated in the drawings, a torque-taking member or fixed support 10 is detachably associated with a fixed element of the vehicle, for example a stub axle (not shown). A disc 12 is associated with a rotary part such as the hub of the corresponding wheel of the vehicle (not shown). The fixed support 10 is disposed adjacent a first side 14 of the disc 12 and has two axial extensions 16, 18 which extend beyond the circumference of the disc 12 and are offset circumferentially relative to the latter. The extensions 16, 18 form sleeves defining bores 20, 22 respectively, which slidably receive two columns 24, 26. The columns 24, 26 are associated with a caliper 28 by way of locking means 30 which will be described in more detail below. The caliper 28 straddles the disc 12 and is provided with actuating means 32, which, in the described embodiment, comprise a piston 34 slidable in a fluid-tight manner (due to a seal 36) in a cylinder 38 formed in that side of the caliper adjoining the fixed support 10. The piston 34 urges one friction element 40 directly on to the side 14 of the disc 12. A second friction element 44 is urged by reaction on to the other side 46 of the disc 12 by the assembly comprising the caliper 28, the columns 24, 26 and the caliper's reaction portion 42. The friction element 44 is associated with the reaction portion 42 of the caliper by removable support means, consisting of screws 48. In the embodiment described, the friction element 40 is slidably supported in and braced against an opening 50 in the fixed support 10, between the extensions 16, 18.

Figure 2:
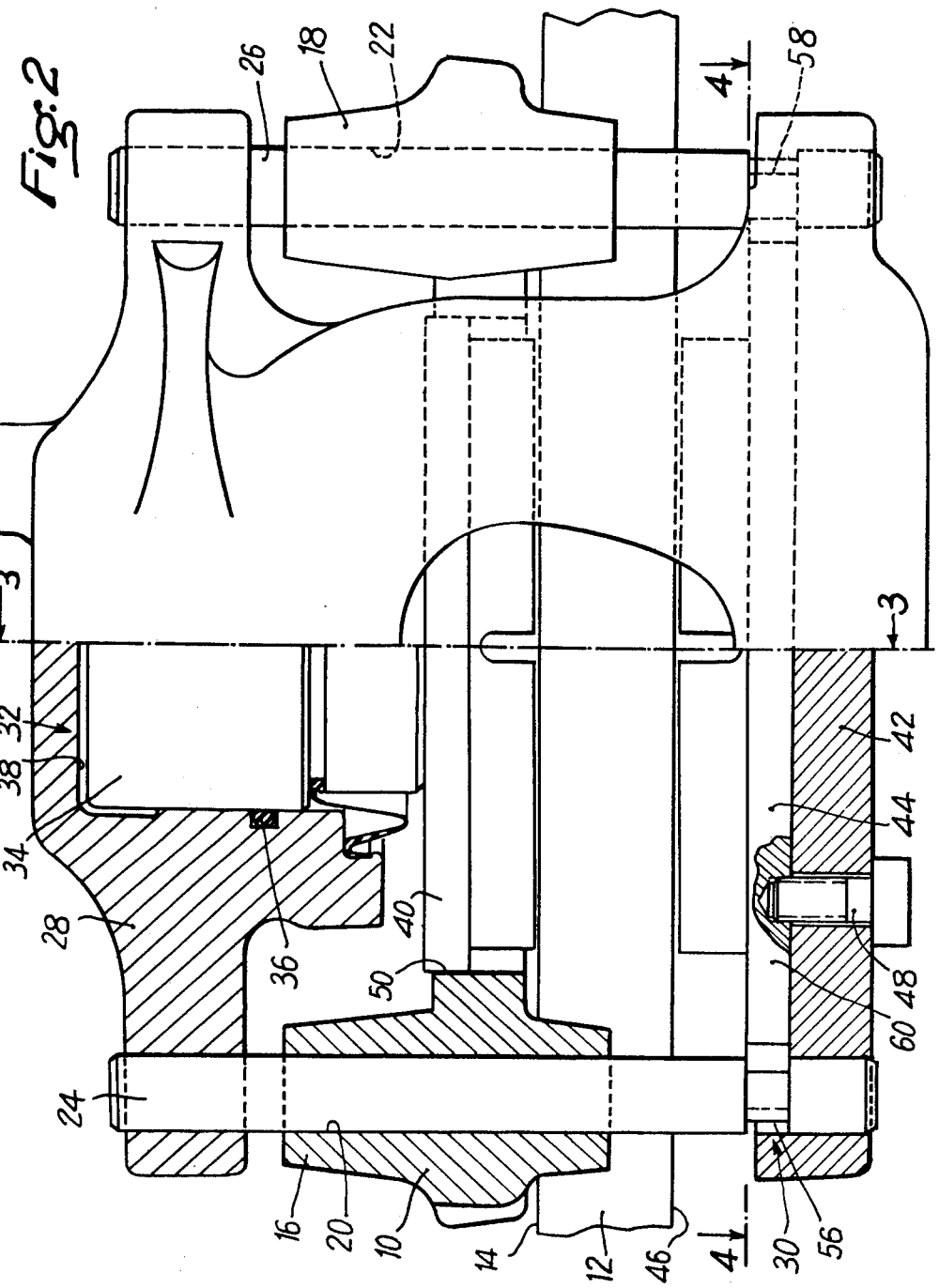
FIG. 2 is a plan view of the brake, half in section along a line 2—2 in FIG. 1.
Figure 3:
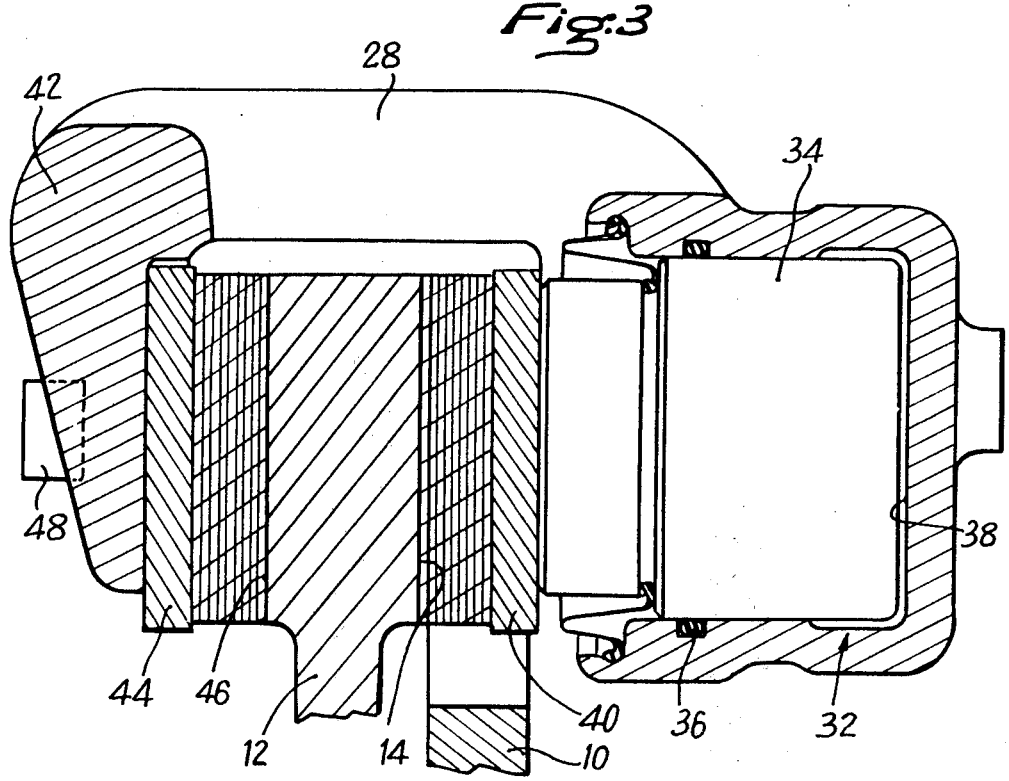
FIG. 3 represents a section along a line 3—3 in FIG. 2.
Figure 4:
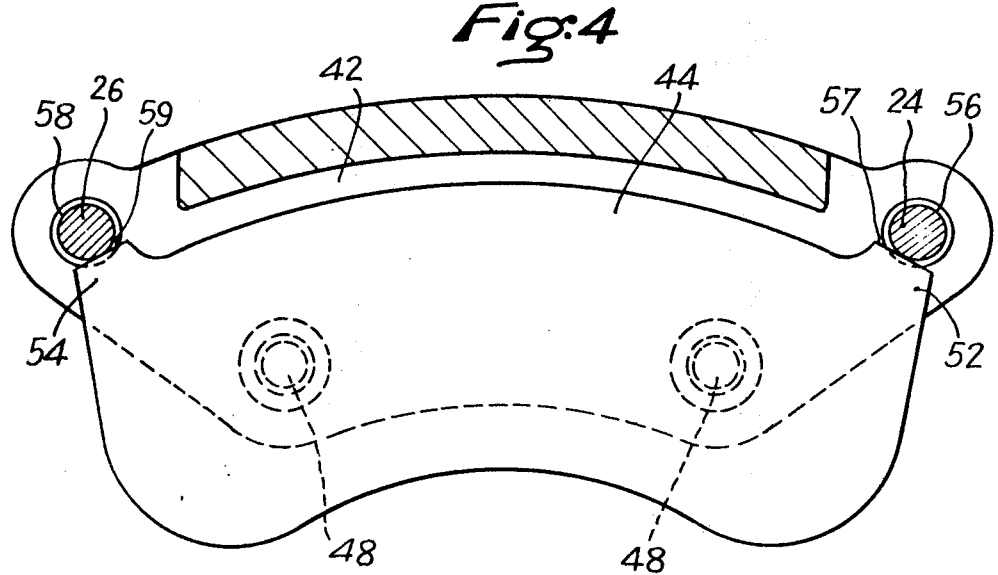
FIG. 4 shows a section along a line 4—4 in FIG. 2.

The friction element 44 has at each of its circumferential ends a radial projection or lug 52, 54 (best shown in FIG. 4) of which the unlined end enters an annular groove 56, 58 formed in the respective column 24 or 26. In the embodiment described, the extreme edges 57, 59 of the lugs 52, 54 respectively are substantially flat and cooperate with the bottoms of the grooves 56, 58. As FIG. 2 shows, the grooves 56, 58 extend axially over a length substantially equalling the thickness of the backing plate 60 of the friction element 44. The lugs 52, 54 and the grooves 56, 58 constitute the locking means 30 mentioned above. For, since the friction element 44 is fixed to the caliper 28 by the screws 48, the introduction of the lugs 52, 54 into the grooves 56, 58 prevents any axial motion of the columns 24, 26 relative to the caliper. Furthermore as is clear from FIG. 4, the friction element 44 can be extracted radially inwards into the brake after removal of the screws 48.

The disc brake just described oprates as follows:

When the brake is operated, brake fluid is admitted to the chamber defined between the cylinder 38 and the piston 34. Under the influence of this pressure fluid the piston 34 moves towards the disc, so urging the friction element 40 into frictional contact with the side 14 of the disc 12. By reaction, the assembly comprising the caliper 28, the columns 24 and 26 and the caliper's reaction portion 42 urges the friction element 44 into frictional engagement with the side 46 of the disc 12. In the described embodiment the forces generated during the frictional contact between the friction element 40 and disc 12 are transmitted directly to the fixed support 10 by one of the latter's extensions 16, 18, depending on the direction in which the disc is rotating. On the other hand, the forces generated during frictional contact between the element 44 and the side 46 of the disc 12 are transmitted by the caliper's reaction portion 42 and columns 24, 26 to both extensions 16 and 18 in equal parts, irrespective of the direction of disc rotation.

Assembly of the brake just described is carried out as follows:

The pad 40 is first placed in the opening 50 in the fixed support, and the caliper 28 is offered up above the disc, the columns 24, 26 and friction element 44 having previously been removed. The columns 24, 26 are now threaded through the respective bores 20, 22 in the fixed support and corresponding bores in the caliper. Lastly, the friction element 44 is put in position so that the lugs 52, 54 enter the grooves 56, 58 in the corresponding columns, and the whole assembly is locked by inserting the screws 48. To dismantle the brake, this sequence of operations is simply reversed.

As already mentioned, the invention consists in immobilizing the columns axially relative to the caliper by locking means provided between the columns and the outer friction element, the latter being detachably connected to the caliper. Consequently, the invention is not restricted to disc brakes of the type just described by way of example, but relates equally to disc brakes in which there is only one column combined for example with a torque and groove connection and to disc brakes in which the inner friction element also is braced on the columns in which cases the caliper and the fixed support are designed differently from the caliper 28 and from the support 10 described. The inner friction element may, for example, be identical to the outer friction element, and if the locking means are the same as those described it can be braced against column portions of reduced diameter whose length is such as to allow the caliper to slide relative to the fixed support and the inner friction element to slide relative to the caliper.

Similarly, the locking means inserted between the columns and the outer friction element are not restricted to those described by way of example, but cover all disc brakes in which at least part of the outer friction element fits into or on to a corrsponding portion formed on each column to make an axial connection between the columns and the outer friction element.

Furthermore, removal of the outer friction element, which is effected radially inwards into the brake in the embodiment described, may be effected in any other manner after release of the fixing elements, the screws serving to fix the outer friction element to the caliper being replaceable by any other fixing element without thereby exceeding the scope of the invention.

What we claim is:

1. A disc brake comprising:
   a disc having two friction faces;
   a torque taking member disposed adjacent the disc;
   a caliper slidably mounted by way of at least one column on said torque taking member;
   actuating means cooperating with the caliper to urge a first friction element into engagement with one face of the disc and a second friction element, by reaction, into engagement with the other face of the disc;
   locking means axially fixing said caliper relative to the one column;
   said locking means comprising a portion of the second friction element in engagement with a portion of the one column to axially secure the caliper to the one column.

2. The disc brake of claim 1 in which the second friction element includes a backing plate and the portion of the second friction element comprises an extension on the backing plate, said one column including a slot receiving the backing plate extension.

3. The disc brake of claim 2 in which said slot is an annular groove on the one column.

4. The disc brake of column 2 in which said slot is a recess extending partly circumferentially over the one column.

5. A disc brake comprising:
   a disc having two friction faces;
   a torque-taking member disposed adjacent the disc;
   a caliper slidably mounted by way of columns on said torque-taking member;
   actuating means associated with the caliper to urge a first friction element directly onto a first of said friction faces and a second friction element by reaction on to the other friction face;
   removable support means being provided between the caliper and said second friction element to remove the last element from the disc brake after removal of the support means; and
   locking means fixing the columns axially relative to the caliper;
   said locking means comprising a portion of the second friction element engaging a corresponding portion on said columns;
   said second friction element including a backing plate having radial extensions which are substantially flat to cooperate with a bottom of a corresponding slot on the columns.

* * * * *